(12) United States Patent
Fink et al.

(10) Patent No.: US 7,528,194 B2
(45) Date of Patent: May 5, 2009

(54) COMB COPOLYMERS WITH DEFINED SIDE CHAINS AND PROCESS FOR THEIR MANUFACTURE

(75) Inventors: Jochen Fink, Nussloch (DE); Michael Roth, Lautertal (DE); Rudolf Pfaendner, Rimbach (DE)

(73) Assignee: Ciba Specialty Chemicals Corp., Tarrytown, NY (US)

( * ) Notice: Subject to any disclaimer, the term of this patent is extended or adjusted under 35 U.S.C. 154(b) by 608 days.

(21) Appl. No.: 10/543,427

(22) PCT Filed: Feb. 2, 2004

(86) PCT No.: PCT/EP2004/050063

§ 371 (c)(1),
(2), (4) Date: Jul. 26, 2005

(87) PCT Pub. No.: WO2004/069887

PCT Pub. Date: Aug. 19, 2004

(65) Prior Publication Data

US 2006/0194053 A1    Aug. 31, 2006

(30) Foreign Application Priority Data

Feb. 10, 2003    (EP) .................. 03405071

(51) Int. Cl.
*C08L 51/06* (2006.01)
*C08F 2/38* (2006.01)

(52) U.S. Cl. ............... 525/78; 525/72; 525/73; 525/74; 525/77; 525/79; 525/243

(58) Field of Classification Search ............ 525/207, 525/212, 217, 218, 219, 221, 72, 73, 74, 525/77, 78, 79, 243
See application file for complete search history.

(56) References Cited

U.S. PATENT DOCUMENTS

| | | | |
|---|---|---|---|
| 3,390,206 A | 6/1968 | Thompson et al. | 260/875 |
| 4,581,429 A | 4/1986 | Solomon et al. | 526/220 |
| 5,721,320 A | 2/1998 | Priddy et al. | 525/316 |
| 6,262,206 B1 | 7/2001 | Nesvadba et al. | 526/220 |
| 6,353,107 B1 | 3/2002 | Kramer et al. | 546/216 |
| 6,444,754 B1 * | 9/2002 | Chin et al. | 525/92 B |
| 6,518,326 B1 | 2/2003 | Nesvadba et al. | 522/12 |
| 6,525,151 B1 | 2/2003 | Roth et al. | 549/427 |
| 6,566,468 B1 | 5/2003 | Fuso et al. | 526/220 |
| 2001/0008928 A1 | 7/2001 | Nesvadba et al. | 526/220 |
| 2001/0039315 A1 | 11/2001 | Nesvadba et al. | 525/374 |
| 2002/0107397 A1 | 8/2002 | Kramer et al. | 546/192 |
| 2003/0125489 A1 | 7/2003 | Nesvadba et al. | 526/217 |
| 2003/0220423 A1 | 11/2003 | Kramer et al. | 524/99 |
| 2004/0049043 A1 | 3/2004 | Fuso et al. | 546/184 |
| 2005/0215720 A1 | 9/2005 | Fink et al. | 525/242 |

FOREIGN PATENT DOCUMENTS

| | | |
|---|---|---|
| EP | 0135280 | 3/1985 |
| WO | 98/13392 | 4/1998 |
| WO | 99/03894 | 1/1999 |
| WO | 99/46261 | 9/1999 |
| WO | 00/07981 | 2/2000 |
| WO | 00/14134 | 3/2000 |
| WO | 02/48109 | 6/2002 |
| WO | 02/100831 | 12/2002 |

* cited by examiner

*Primary Examiner*—Fred M Teskin
(74) *Attorney, Agent, or Firm*—Tyler A. Stevenson

(57) ABSTRACT

The present invention relates to the modification of copolymers, in particular of grafted copolymers into comb copolymers. The modification comprises the steps (i) of controlled radical polymerization of a polymer or copolymer bearing a epoxide group at one end resulting from the initiation step, and (ii) a heating step of the polymer prepared under (i) and a copolymer bearing a functional group either in the backbone or attached to a side chain, which is able to react with the epxide group. The result is a comb copolymer with well controlled chain length of the grafted side arms expressed for example by a low polydispersity.

15 Claims, No Drawings

COMB COPOLYMERS WITH DEFINED SIDE CHAINS AND PROCESS FOR THEIR MANUFACTURE

The present invention relates to the modification of copolymers, in particular of grafted copolymers into comb copolymers. The modification comprises the steps (i) of controlled radical polymerization of a polymer or copolymer bearing an epoxide group at one end resulting from the initiation step, and (ii) a heating step of the polymer prepared under (i) and a copolymer bearing a functional group either in the backbone or attached to a side chain, which is able to react with the epxide group. The result is a comb copolymer with well controlled chain length of the grafted side arms expressed for example by a low polydispersity. Further aspects of the invention are a composition of the polymers (i) and (ii), a comb copolymer obtainable according to the process and the use of such a comb copolymer as for example compatibilizer, impact modifier or barrier material.

Increasing activities have been directed towards chemical modifications of existing polymers in order to obtain functional and/or engineered new materials. Chemical modifications of existing polymers are important for at least two reasons: 1. They can be an inexpensive and rapid way of obtaining new polymers without having to search for new monomers. 2. They may be the only way to synthesize polymers with the intended new characteristics.

A heating process is often a melt processing step, such as for example reactive extrusion. It is a frequently used technical process for the modification of polymers and their properties.

In order to obtain a grafted (co)polymer, reactive extrusion is usually carried out by extruding a (co)polymer, an ethylenically unsaturated compound and a peroxide as radical generator. According to the type of modification (e.g. with maleic acid anhydride, glycidyl methylmethacrylate or vinylsilanes) the resulting polymers are used as compatibilizers, adhesives or surface-modifiers. This is for example described in Reactive Modifiers for Polymers, edited by S. Al-Malaika, Chapman & Hall, 1997 chapter 1 pages 1-97. The processes are mainly based on peroxides as radical generators. These prior art processes show severe disadvantages, such as side reactions, which influence the processing performance (polymer degradation, crosslinking/gel formation) or loss of long term thermal stability of the polymer by residual peroxides or their reaction products. Safety aspects with regard to the processing of plastic materials with peroxides are an additional issue.

Graft copolymers with oligomeric or polymeric side chains are difficult to access by usual grafting processes. A possible method is described in WO 00/14134 and WO 00/14135. Wherein in a two-stage process "initiation points" are firstly generated on a polymer and subsequently controlled polymerization reaction is carried out starting from the initiation points. However, it is difficult to attach high numbers of side chains by this method.

The present invention provides a method for the preparation of well-defined, easily accessible comb polymer structures via condensation reactions between functional groups on the polymer backbone (e.g. polypropylene-graft maleic acid anhydride) with mono-functionalized oligomers/polymers. The process of the instant invention can be carried out by reactive extrusion and is excellently suitable for large-scale industrial processes.

It has been found that by grafting epoxy-functionalized NO-terminated-oligomers/polymers, prepared by controlled free radical polymerization (CFRP) on polymers containing groups capable to react with epoxides (e.g. maleic acid anhydride, MAA), comb copolymers can be prepared having the desired material properties. Because of the low polydispersity of the epoxy-functionalized NO-terminated-oligomers/polymers the side chains of the resulting comb polymers are well-defined leading to improved material properties. The epoxy-functionalized NO-terminated-oligomer/polymer is grafted via a coupling reaction of the epoxy-group with the functional group (e.g. MAA) on the polymer backbone.

One aspect of the invention is a method for the preparation of a comb copolymer comprising the steps a) polymerizing an ethylenically unsaturated monomer to a oligomer, cooligomer, polymer or copolymer in the presence of an initiator/regulator of formula (I)

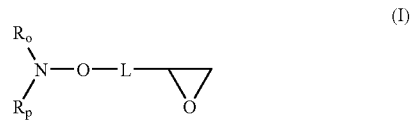

wherein L is a linking group selected from the group consisting of $C_1$-$C_{18}$alkylene, phenylene, $C_1$-$C_{18}$alkylene-oxy substituted with a phenyl group, phenylene-$C_1$-$C_{18}$alkylene, $C_1$-$C_{18}$alkylene-phenylene, $C_1$-$C_{18}$alkylene-phenylene-oxy and $C_5$-$C_{12}$cycloalkylene;

$R_p$ and $R_q$ are independently tertiary bound $C_4$-$C_{26}$alkyl groups or $C_3$-$C_{17}$ secondary bound alkyl groups which are unsubstituted or substitituted by one or more electron withdrawing groups or by phenyl; or $R_p$ and $R_q$ together form a 5, 6 or 7 membered heterocyclic ring which is substituted at least by 4 $C_1$-$C_4$alkyl groups and which may be interrupted by a further nitrogen or oxygen atom; and in a second step b) reacting the polymer or copolymer prepared under a) together with a random, block or graft copolymer, having attached a functional group X selected from the group consisting of

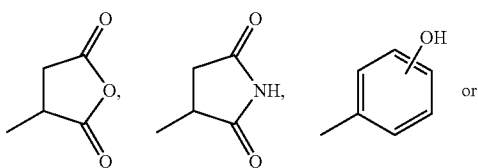

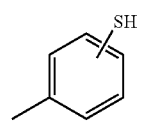

or having a group X

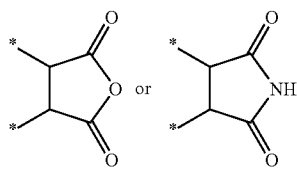

as repetitive unit in the backbone wherein R' is $C_1$-$C_{18}$alkyl;
in the melt in an apparatus suitable for mixing a polymer melt.

Examples for $C_1$-$C_{18}$alkylene-oxy substituted with a phenyl group are the groups

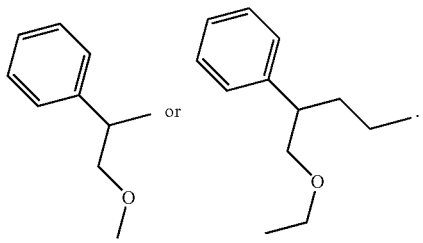

$C_1$-$C_{18}$alkylene-phenylene-oxy is for example

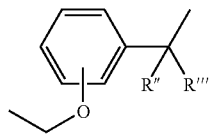

wherein R" and R'" are independently hydrogen or $C_1$-$C_8$alkyl, which may be linear or branched. The oxy substitution is preferably in the para position.

$C_5$-$C_{12}$cycloalkylene is typically cyclopentyl or cyclohexyl.

$R_p$ and $R_q$ together with the nitrogen atom to which they are bonded form for example a 5, 6 or 7 membered heterocyclic ring which is substituted at least by 4 $C_1$-$C_4$alkyl groups and which may be interrupted by a further nitrogen or oxygen atom. Preference is given to 6 membered heterocyclic rings, in particular to piperidine rings.

The ethylenically unsaturated monomer of step a) can be chosen from a variety of monomers. Such as isoprene, 1,3-butadiene, α-$C_5$-$C_{18}$alkene, styrene, α-methyl styrene, p-methyl styrene p-tert-butyl-styrene or a compound of formula $CH_2$=$C(R_a)$—(C=Z)-$R_b$, wherein $R_a$ is hydrogen or $C_1$-$C_4$alkyl, $R_b$ is $NH_2$, $O^-(Me^+)$, unsubstituted $C_1$-$C_{18}$alkoxy, $C_2$-$C_{100}$alkoxy, interrupted by at least one N and/or O atom, or hydroxy-substituted $C_1$-$C_{18}$alkoxy, unsubstituted $C_1$-$C_{18}$alkylamino, di($C_1$-$C_{18}$alkyl)amino, hydroxy-substituted $C_1$-$C_{18}$alkylamino or hydroxy-substituted di($C_1$-$C_{18}$alkyl)amino, —O—$CH_2$—$CH_2$—$N(CH_3)_2$ or —O—$CH_2$—$CH_2$—$N^+H(CH_3)_2 An^-$;

$An^-$ is a anion of a monovalent organic or inorganic acid;
Me is a monovalent metal atom or the ammonium ion.
Z is oxygen or sulfur.

Examples for $R_a$ as $C_2$-$C_{100}$alkoxy interrupted by at least one O atom are of formula

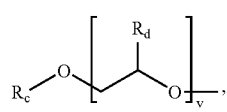

wherein $R_c$ is $C_1$-$C_{25}$alkyl, phenyl or phenyl substituted by $C_1$-$C_{18}$alkyl, $R_d$ is hydrogen or methyl and v is a number from 1 to 50. These monomers are for example derived from non ionic surfactants by acrylation of the corresponding alkoxylated alcohols or phenols. The repeating units may be derived from ethylene oxide, propylene oxide or mixtures of both.

Further examples of suitable acrylate or methacrylate monomers are given below.

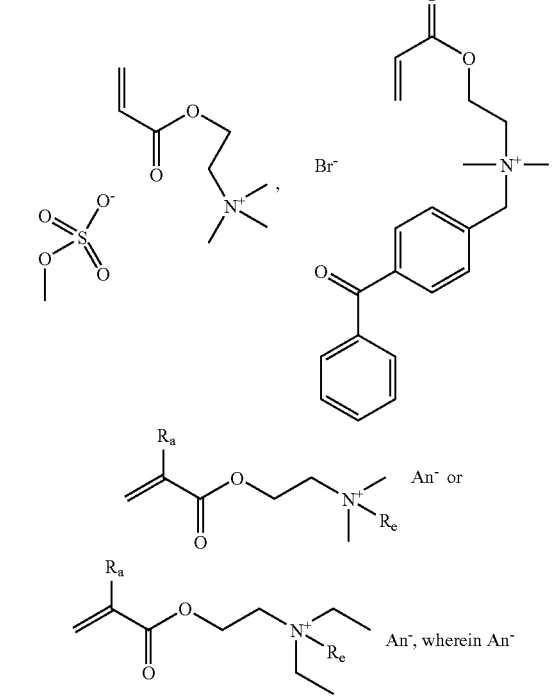

and $R_a$ have the meaning as defined above and $R_e$ is methyl, benzyl or benzoylbenzyl. $An^-$ is preferably $Cl^-$, $Br^-$ or $^-O_3S$—O—$CH_3$.

Further acrylate monomers are

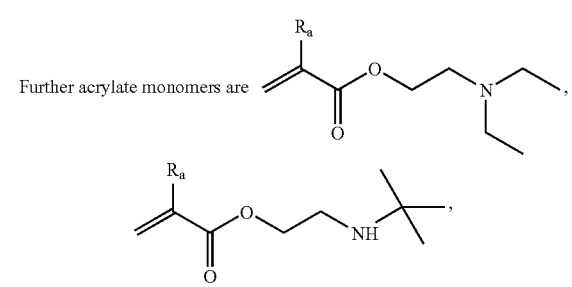

-continued

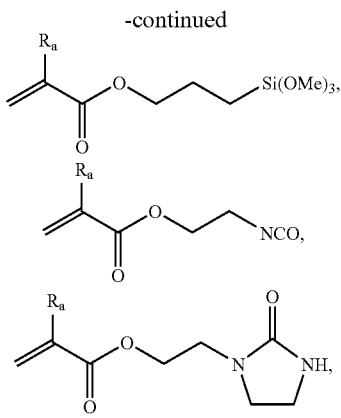

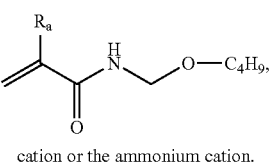

cation or the ammonium cation.

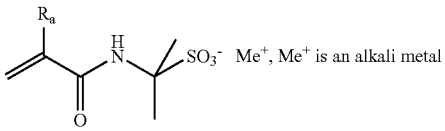

Examples for suitable monomers other than acrylates are

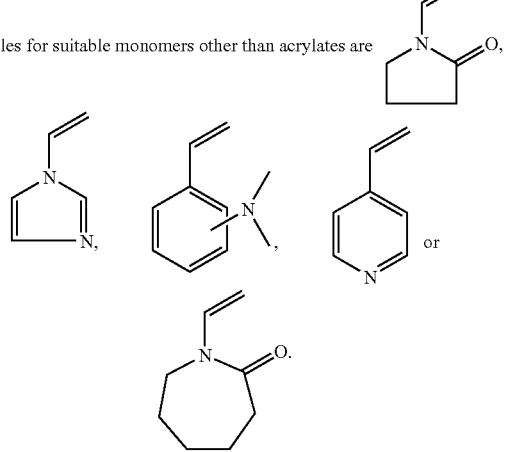

Preferably $R_a$ is hydrogen or methyl, $R_b$ is $NH_2$, gycidyl, unsubstituted or with hydroxy substituted $C_1$-$C_4$alkoxy, unsubstituted $C_1$-$C_4$alkylamino, di($C_1$-$C_4$alkyl)amino, hydroxy-substituted $C_1$-$C_4$alkylamino or hydroxy-substituted di($C_1$-$C_4$alkyl)amino; and
Z is oxygen.

The ethylenically unsaturated monomer of step a) is for example selected from the group consisting of styrene, substituted styrene, conjugated dienes, vinyl acetate, vinylpyridine, vinylpyrrolidone, vinylimidazole, maleic anhydride, (alkyl)acrylic acidanhydrides, (alkyl)acrylic acid salts, (alkyl)acrylic esters, (meth)acrylonitriles, (alkyl)acrylamides, vinyl halides and vinylidene halides.

For instance the ethylenically unsaturated monomer is styrene, substituted styrene, methylacrylate, ethylacrylate, butylacrylate, isobutylacrylate, tert. butylacrylate, hydroxyethylacrylate, hydroxypropylacrylate, dimethylaminoethylacrylate, methyl(meth)acrylate, ethyl (meth)acrylate, butyl(meth)acrylate, hydroxyethyl(meth) acrylate, hydroxypropyl(meth) acrylate, dimethylaminoethyl (meth)acrylate, acrylonitrile, methacrylonitrile, acrylamide, methacrylamide or dimethylaminopropyl-methacrylamide.

Very suitable monomers are for example styrene, $C_1$-$C_8$alkylesters of acrylic or methacrylic acid, such as n-butylacrylate or methacrylate, acrylonitrile or methacrylonitrile, in particular styrene, acrylonitrile and n-butylacrylate.

It is also possible to use mixtures of the afore mentioned monomers, in particular styrene/acrylonitrile, styrene/butylacrylate, styrene/methylmethacrylate and styrene/butylmethacrylate.

In a specific embodiment of the invention the initiator/regulator is of formula (IIa)

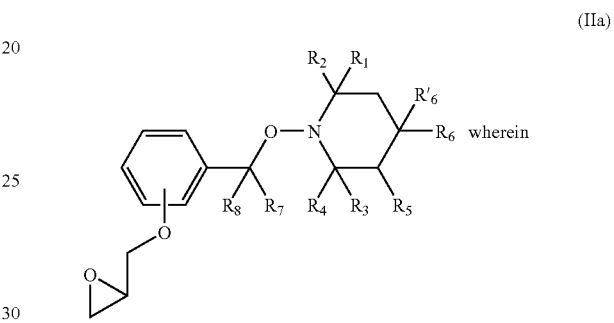

(IIa)

$R_1$, $R_2$, $R_3$ and $R_4$ are independently of each other $C_1$-$C_4$alkyl;
$R_5$ is hydrogen or $C_1$-$C_4$alkyl;
$R'_6$ is hydrogen and $R_6$ is H, $OR_{10}$, $NR_{10}R_{11}$, —O—C(O)—$R_{10}$ or $NR_{11}$—C(O)—$R_{10}$;
$R_{10}$ and $R_{11}$ independently are hydrogen, $C_1$-$C_{18}$alkyl, $C_2$-$C_{18}$alkenyl, $C_2$-$C_{18}$alkinyl or $C_2$-$C_{18}$alkyl which is substituted by at least one hydroxy group or, if $R_6$ is $NR_{10}R_{11}$, taken together, form a $C_2$-$C_{12}$alkylene bridge or a $C_2$-$C_{12}$-alkylene bridge interrupted by at least one O atom; or
$R_6$ and $R'_6$ together are both hydrogen, a group =O or =N—O—$R_{20}$ wherein
$R_{20}$ is H, straight or branched $C_1$-$C_{18}$alkyl, $C_3$-$C_{18}$alkenyl or $C_3$-$C_{18}$alkinyl, which may be unsubstituted or substituted, by one or more OH, $C_1$-$C_8$ alkoxy, carboxy, $C_1$-$C_8$alkoxycarbonyl;
$C_5$-$C_{12}$cycloalkyl or $C_5$-$C_{12}$cycloalkenyl;
phenyl, $C_7$-$C_9$phenylalkyl or naphthyl which may be unsubstituted or substituted by one or more $C_1$-$C_8$alkyl, halogen, OH, $C_1$-$C_8$alkoxy, carboxy, $C_1$-$C_8$alkoxycarbonyl;
—C(O)—$C_1$-$C_{38}$alkyl, or an acyl moiety of a α,β-unsaturated carboxylic acid having 3 to 5 carbon atoms or of an aromatic carboxylic acid having 7 to 15 carbon atoms;
—$SO_3^-Q^+$, —$PO(O^-Q^+)_2$, —$P(O)(OR_2)_2$, —$SO_2$—$R_2$, —CO—NH—$R_2$, —$CONH_2$, $COOR_2$, or $Si(Me)_3$, wherein $Q^+$ is $H^+$, ammonium or an alkali metal cation; or
$R_6$ and $R_6'$ are independently —O—$C_1$-$C_{12}$alkyl, —O—$C_1$-$C_{12}$alkenyl, —O—$C_3$-$C_{12}$alkinyl, —O—$C_5$-$C_8$cycloalkyl, —O-phenyl, —O-naphthyl, —O—$C_7$-$C_9$phenylalkyl; or
$R_6$ and $R'_6$ together form one of the bivalent groups —O—C($R_{21}$)($R_{22}$)—CH($R_{23}$)—O—, —O—CH($R_{21}$)—$CH_{22}$-C($R_{22}$)($R_{23}$)—O—, —O—CH($R_{22}$)—$CH_2$-C($R_{21}$)($R_{23}$)—O—, —O—$CH_2$-C($R_{21}$)($R_{22}$)—CH($R_{23}$)—O—, —O—o—phenylene—O—, —O-1,2-cyclohexyliden-O—,

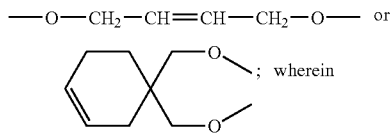

$R_{21}$ is hydrogen, $C_1$-$C_{12}$alkyl, COOH, COO—($C_1$-$C_{12}$)alkyl or $CH_2OR_{24}$;

$R_{22}$ and $R_{23}$ are independently hydrogen, methyl ethyl, COOH or COO—($C_1$-$C_{12}$)alkyl;

$R_{24}$ is hydrogen, $C_1$-$C_{12}$alkyl, benzyl or a monovalent acyl residue derived from an aliphatic, cycloaliphatic or aromatic monocarboxylic acid having up to 18 carbon atoms; and $R_7$ and $R_8$ are independently hydrogen or $C_1$-$C_{18}$alkyl.

$C_1$-$C_{18}$alkyl can be linear or branched. Examples are methyl, ethyl, propyl, isopropyl, butyl, 2-butyl, isobutyl, t-butyl, pentyl, 2-pentyl, hexyl, heptyl, octyl, 2-ethylhexyl, t-octyl, nonyl, decyl, undecyl, dodecyl or octadecyl. Where up to $C_{36}$alkyl is possible, $C_1$-$C_{18}$alkyl is preferred.

Alkyl substituted by a group —COOH is for example $CH_2$—COOH, $CH_2$—$CH_2$—COOH, $(CH_2)_3$—COOH or $CH_2$—CHCOOH—$CH_2$—$CH_3$ Hydroxyl- or alkoxycarbonyl substituted $C_1$-$C_{18}$alkyl can be, for example, 2-hydroxyethyl, 2-hydroxypropyl, methoxycarbonylmethyl or 2-ethoxycarbonylethyl.

Alkenyl having from 2 to 18 carbon atoms is a branched or unbranched radical, for example propenyl, 2-butenyl, 3-butenyl, isobutenyl, n-2,4-pentadienyl, 3-methyl-2butenyl, n-2-octenyl, n-2-dodecenyl, isododecenyl.

Alkinyl having from 2 to 18 carbon atoms is a branched or unbranched radical, for example propinyl, 2-butinyl, 3-butinyl, isobutinyl, n-2,4-pentadiinyl, 3-methyl-2-butinyl, n-2-octinyl, n-2-dodecinyl, isododecinyl.

Examples of alkoxy are methoxy, ethoxy, propoxy, isopropoxy, butoxy, isobutoxy, pentoxy, isopentoxy, hexoxy, heptoxy or octoxy.

$C_7$-$C_9$phenylalkyl is for example benzyl, α-methylbenzyl, α,α-dimethylbenzyl or 2-phenylethyl, benzyl is preferred.

$C_5$-$C_{12}$cycloalkyl is for example cyclopentyl, cyclohexyl, cycloheptyl, methylcyclopentyl or cyclooctyl.

$C_5$-$C_{12}$cycloalkenyl is for example 3-cyclopentenyl, 3-cyclohexenyl or 3-cycloheptenyl.

Examples of a monocarboxylic acid having up to 18 carbon atoms are formic acid, acetic acid, propionic acid, the isomers of valeric acid, methyl ethyl acetic acid, trimethyl acetic acid, capronic acid, lauric acid or stearic acid. Examples for unsaturated aliphatic acids are acrylic acid, methacrylic acid, crotonic acid, linolic acid and oleic acid.

Typical examples of cycloaliphatic carboxylic acids are cyclohexane carboxylic acid or cyclopentane carboxylic acid.

Examples of aromatic carboxylic acids are benzoic acid, salicylic acid or cinnamic acid.

Halogen is F, Cl, Br or I.

$C_1$-$C_{18}$alkylene is a branched or unbranched radical, for example methylene, ethylene, propylene, trimethylene, tetramethylene, pentamethylene, hexamethylene, heptamethylene, octamethylene, decamethylene or dodecamethylene.

$C_2$-$C_{12}$alkylene bridges interrupted by at least one O atom are, for example, —$CH_2$—O—$CH_2$—$CH_2$—, —$CH_2$—O—$CH_2$—$CH_2$—$CH_2$—, —$CH_2$—O—$CH_2$—$CH_2$—$CH_2$—, —$CH_2$—O—$CH_2$—$CH_2$—O—$CH_2$—.

Alkoxycarbonyl is for example methoxycarbonyl, ethoxycarbonyl or propoxycarbonyl.

For example $R_1$, $R_2$, $R_3$, $R_4$ are methyl, or $R_1$ and $R_3$ are ethyl and $R_2$ and $R_4$ are meth and $R_2$ are ethyl and $R_3$ and $R_4$ are methyl.

For instance $R_5$ is hydrogen or methyl.

In a specific embodiment of the invention $R'_6$ is hydrogen and $R_6$ is H, $OR_{10}$, $NR_{10}R_{11}$, —O—C(O)—$R_{10}$ or $NR_{11}$—C(O)—$R_{10}$;

$R_{10}$ and $R_{11}$ independently are hydrogen, $C_1$-$C_{18}$alkyl, $C_2$-$C_{18}$alkenyl, $C_2$-$C_{18}$alkinyl or $C_2$-$C_{18}$alkyl which is substituted by at least one hydroxy group or, if $R_6$ is $NR_{10}R_{11}$, taken together, form a $C_2$-$C_{12}$alkylene bridge or a $C_2$-$C_{12}$alkylene bridge interrupted by at least one O atom; or $R_6$ and $R'_6$ together are both hydrogen, a group =O or =N—O—$R_{20}$ wherein $R_{20}$ is H or straight or branched $C_1$-$C_{18}$alkyl.

In particular $R_6$ and $R'_6$ together form one of the bivalent groups —O—C($R_{21}$)($R_{22}$)—CH($R_{23}$)—O—, —O—CH($R_{21}$)—$CH_{22}$—C($R_{22}$)($R_{23}$)—O—, —O—CH($R_{22}$)$CH_2$—C($R_{21}$)($R_{23}$)—O—, —O—$CH_2$—C($R_{21}$)($R_{22}$)—CH($R_{23}$)—O— and $R_{21}$, $R_{22}$ and $R_{23}$ have the meaning as defined above.

In another embodiment of the invention the initiator/regulator is of formula (IIb)

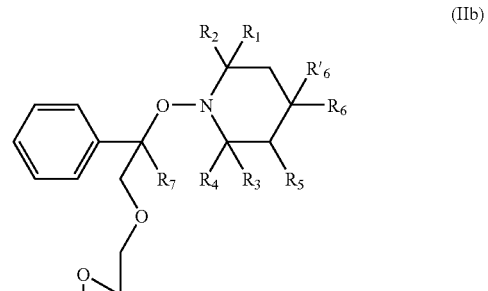

and the substituents $R_1$ to $R_7$ are as defined above.

Specific compounds are given in Table A

TABLE A

| Compound Number | Structure |
|---|---|
| 101 | 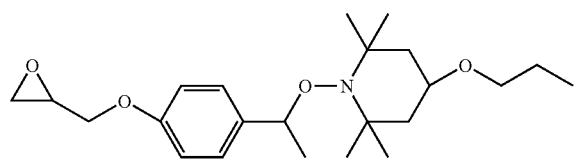 |

TABLE A-continued

| Compound Number | Structure |
|---|---|
| 102 | 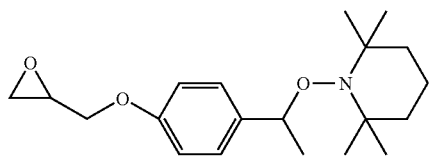 |
| 103 | 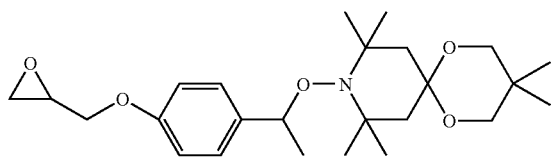 |
| 104 | 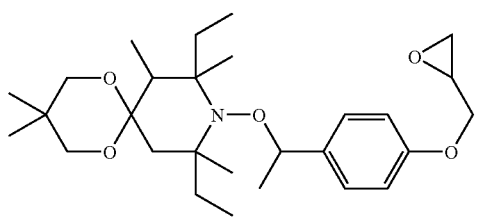 |
| 105 | 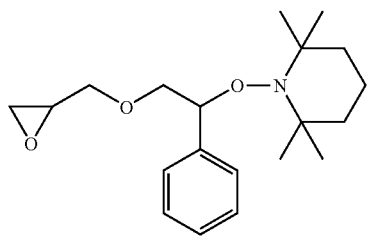 |

The compounds of formula IIa and IIb and in particular the compounds given in Table A are known and may be prepared as described in WO 99/46261, WO 02/48109, U.S. Pat. No. 5,721,320 or WO97/36944.

Further nitroxyl radicals are principally known from U.S. Pat. No. 4,581,429 or EP-A-621 878. Particularly useful are the open chain compounds described in WO 98/13392, WO 99/03894 and WO 00/07981, the piperidine derivatives described in WO 99/67298 and GB 2335190 or the heterocyclic compounds described in GB 2342649 and WO 96/24620. Still further suitable nitroxyl radicals are described in WO 02/4805 and in WO 02/100831. These nitroxyl radicals can be reacted in analogy to prepare the corresponding epoxy functionalized nitroxyl ethers. Also suitable is compound (106).

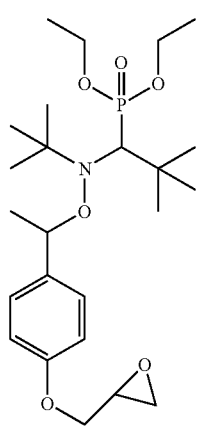

(106)

The compound can be prepared according to WO 96/24620 and functionalized with the epoxy group as described for example in WO 02/48109.

The radical polymerization process of step a) is known and may be carried out in bulk, in the presence of an organic solvent or in the presence of water or in mixtures of organic solvents and water. Additional cosolvents or surfactants, such as glycols or ammonium salts of fatty acids, may be present. Other suitable cosolvents are described hereinafter.

If organic solvents are used, suitable solvents or mixtures of solvents are typically pure alkanes (hexane, heptane, octane, isooctane), aromatic hydrocarbons (benzene, toluene, xylene), halogenated hydrocarbons (chlorobenzene), alkanols (methanol, ethanol, ethylene glycol, ethylene glycol monomethyl ether), esters (ethyl acetate, propyl, butyl or hexyl acetate) and ethers (diethyl ether, dibutyl ether, ethylene glycol dimethyl ether), anisol, tert-butyl-benzene or mixtures thereof.

Preferably the compound of formula (IIa) or (IIb) is present in an amount of 0.001 mol-% to 20 mol-%, based on the monomer or monomer mixture. When monomer mixtures are used, mol-% is calculated on an average molecular weight.

An additional source of free radicals may also be added. The source of free radicals is for example a bis-azo compound, a peroxide, perester or a hydroperoxide.

Scission of the O—C bond of the nitroxylether may be effected by ultrasonic treatment, radiation with actinic light or heating.

The scission of the O—C bond is preferably effected by heating and takes place at a temperature of between 50° C. and 180° C., more preferably from 90° C. to 150° C.

The polymerization reaction is usually carried out under atmospheric pressure.

After the polymerization is completed or the intended monomer conversion is achieved, the polymer is isolated by removing the solvent and/or residual monomer by distillation, stripping with water or precipitation.

The oligomer, cooligomer, polymer or copolymer of step a) has for example a polydispersity ($M_W/M_N$) between 1.0 and 2.5, in particular between 1.1 and 2.0.

The oligomer, cooligomer, polymer or copolymer of step a) preferably has a number molecular weight average from 800 to 100000, more preferably from 1000 to 30 000 Daltons.

The oligomer, cooligomer, polymer or copolymer of step a) is stable after isolation at room temperature and can be stored for several months before being used in step b). It is however also possible to carry out reaction step b) directly after step a).

The polymer of step b) can be choosen from a variety of polymers, which are modified with the reactive groups —COOH, NH$_2$, —NHR', —C(O)—NHR',

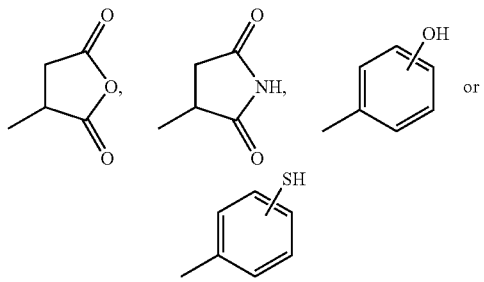

either by conventional graft reaction or by copolymerization having then for example a group

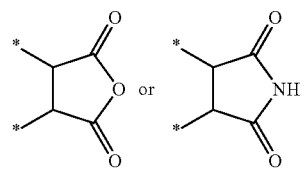

as repetitive unit in the backbone. Polymers, which can be modified with the reactive group are mentioned below.

1. Polymers of monoolefins and diolefins, for example polypropylene, polyisobutylene, polybut-1-ene, poly-4-methylpent-1-ene, polyvinylcyclohexane, polyisoprene or polybutadiene, as well as polymers of cycloolefins, for instance of cyclopentene or norbornene, polyethylene (which optionally can be crosslinked), for example high density polyethylene (HDPE), high density and high molecular weight polyethylene (HDPE-HMW), high density and ultrahigh molecular weight polyethylene (HDPE-UHMW), medium density polyethylene (MDPE), low density polyethylene (LDPE), linear low density polyethylene (LLDPE), (VLDPE) and (ULDPE).

Polyolefins, i.e. the polymers of monoolefins exemplified in the preceding paragraph, preferably polyethylene and polypropylene, can be prepared by different, and especially by the following, methods:

a) radical polymerisation (normally under high pressure and at elevated temperature).

b) catalytic polymerization using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either π- or σ-coordinated. These metal complexes may be in the free form or fixed on substrates, typically on activated magnesium chloride, titanium(III) chloride, alumina or silicon oxide. These catalysts may be soluble or insoluble in the polymerisation medium. The catalysts can be used by themselves in the polymerisation or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, amine or silyl ether groups. These catalyst systems are usually termed Phillips, Standard Oil Indiana, Ziegler (-Natta), TNZ (DuPont), metallocene or single site catalysts (SSC).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, ethylene/vinylcyclohexane copolymers, ethylene/cycloolefin copolymers (e.g. ethylene/norbornene like COC), ethylene/1-olefins copolymers, where the 1-olefin is gene-rated in-situ; propylene/butadiene copolymers, isobutylene/isoprene copolymers, ethylene/vinylcyclohexene copolymers, ethylene/alkyl acrylate copolymers, ethylene/alkyl methacrylate copolymers, ethylene/vinyl acetate copolymers or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethylene-propylene copolymers, LDPE/ethylene-vinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, for example polyamides.

4. Hydrocarbon resins (for example $C_5$-$C_9$) including hydrogenated modifications thereof (e.g. tackifiers) and mixtures of polyalkylenes and starch.

Homopolymers and copolymers from 1.)-4.) may have any stereostructure including syndiotactic, isotactic, hemi-isotactic or atactic; where atactic polymers are preferred. Stereoblock polymers are also included.

5. Polystyrene, poly(p-methylstyrene), poly(α-methylstyrene).

6. Aromatic homopolymers and copolymers derived from vinyl aromatic monomers including styrene, α-methylstyrene, all isomers of vinyl toluene, especially p-vinyltoluene, all isomers of ethyl styrene, propyl styrene, vinyl biphenyl, vinyl naphthalene, and vinyl anthracene, and mixtures thereof. Homopolymers and copolymers may have any stereostructure including syndiotactic, isotactic, hemi-isotactic or atactic; where atactic polymers are preferred. Stereoblock polymers are also included.

6a. Copolymers including aforementioned vinyl aromatic monomers and comonomers selected from ethylene, propylene, dienes, nitrites, acids, maleic anhydrides, maleimides, vinyl acetate and vinyl chloride or acrylic derivatives and mixtures thereof, for example styrene/butadiene, styrene/acrylonitrile, styrene/ethylene (interpolymers), styrene/alkyl methacrylate, styrene/butadiene/alkyl acrylate, styrene/butadiene/alkyl methacrylate, styrene/maleic anhydride, styrene/acrylonitrile/methyl acrylate; mixtures of high impact strength of styrene copolymers and another polymer, for example a polyacrylate, a diene polymer or an ethylene/propylene/diene terpolymer; and block copolymers of styrene such as styrene/butadiene/styrene, styrene/isoprene/styrene, styrene/ethylene/butylene/styrene or styrene/ethylene/propylene/styrene.

6b. Hydrogenated aromatic polymers derived from hydrogenation of polymers mentioned under 6.), especially including polycyclohexylethylene (PCHE) prepared by hydrogenating atactic polystyrene, often referred to as polyvinylcyclohexane (PVCH).

6c. Hydrogenated aromatic polymers derived from hydrogenation of polymers mentioned under 6a.).

Homopolymers and copolymers may have any stereostructure including syndiotactic, isotactic, hemi-isotactic or atactic; where atactic polymers are preferred. Stereoblock polymers are also included.

7. Graft copolymers of vinyl aromatic monomers such as styrene or α-methylstyrene, for example styrene on polybutadiene, styrene on polybutadiene-styrene or polybutadiene-acrylonitrile copolymers; styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene; styrene and alkyl acrylates or methacrylates on polybutadiene; styrene and acrylonitrile on ethylene/propylene/diene terpolymers; styrene and acrylonitrile on polyalkyl acrylates or polyalkyl methacrylates, styrene and acrylonitrile on acrylate/butadiene copolymers, as well as mixtures thereof with the copolymers listed under 6), for example the copolymer mixtures known as ABS, MBS, ASA or AES polymers.

8. Halogen-containing polymers such as polychloroprene, chlorinated rubbers, chlorinated and brominated copolymer of isobutylene-isoprene (halobutyl rubber), chlorinated or sulfo-chlorinated polyethylene, copolymers of ethylene and chlorinated ethylene, epichlorohydrin homo- and copolymers, especially polymers of halogen-containing vinyl compounds, for example polyvinyl chloride, polyvinylidene chloride, polyvinyl fluoride, polyvinylidene fluoride, as well as copolymers thereof such as vinyl chloride/vinylidene chloride, vinyl chloride/vinyl acetate or vinylidene chloride/vinyl acetate copolymers.

9. Polymers derived from α,β-unsaturated acids and derivatives thereof such as polyacrylates and polymethacrylates; polymethyl methacrylates, polyacrylamides and polyacrylonitriles, impact-modified with butyl acrylate.

10. Copolymers of the monomers mentioned under 9) with each other or with other unsaturated monomers, for example acrylonitrile/butadiene copolymers, acrylonitrile/alkyl acrylate copolymers, acrylonitrile/alkoxyalkyl acrylate or acrylonitrile/vinyl halide copolymers or acrylonitrile/alkyl methacrylate/butadiene terpolymers.

11. Polymers derived from unsaturated alcohols and amines or the acyl derivatives or acetals thereof, for example polyvinyl alcohol, polyvinyl acetate, polyvinyl stearate, polyvinyl benzoate, polyvinyl maleate, polyvinyl butyral, polyallyl phthalate or polyallyl melamine; as well as their copolymers with olefins mentioned in 1) above.

12. Homopolymers and copolymers of cyclic ethers such as polyalkylene glycols, polyethylene oxide, polypropylene oxide or copolymers thereof with bisglycidyl ethers.

13. Polyacetals such as polyoxymethylene and those polyoxymethylenes which contain ethylene oxide as a comonomer; polyacetals modified with thermoplastic polyurethanes, acrylates or MBS.

14. Polyphenylene oxides and sulfides, and mixtures of polyphenylene oxides with styrene polymers or polyamides.

15. Polyurethanes derived from hydroxyl-terminated polyethers, polyesters or polybutadienes on the one hand and aliphatic or aromatic polyisocyanates on the other, as well as precursors thereof.

16. Polyamides and copolyamides derived from diamines and dicarboxylic acids and/or from aminocarboxylic acids or the corresponding lactams, for example polyamide 4, polyamide 6, polyamide 6/6, 6/10, 6/9, 6/12, 4/6, 12/12, polyamide 11, polyamide 12, aromatic polyamides starting from m-xylene diamine and adipic acid; polyamides prepared from hexamethylenediamine and isophthalic or/and terephthalic acid and with or without an elastomer as modifier, for example poly-2,4,4,-trimethylhexamethylene terephthalamide or poly-m-phenylene isophthalamide; and also block copolymers of the aforementioned polyamides with polyolefins, olefin copolymers, ionomers or chemically bonded or grafted elastomers; or with polyethers, e.g. with polyethylene glycol, polypropylene glycol or polytetramethylene glycol; as well as polyamides or copolyamides modified with EPDM or ABS; and polyamides condensed during processing (RIM polyamide systems).
17. Polyureas, polyimides, polyamide-imides, polyetherimids, polyesterimids, polyhydantoins and polybenzimidazoles.
18. Polyesters derived from dicarboxylic acids and diols and/or from hydroxycarboxylic acids or the corresponding lactones, for example polyethylene terephthalate, polybutylene terephthalate, poly-1,4-dimethylolcyclohexane terephthalate, polyalkylene naphthalate (PAN) and polyhydroxybenzoates, as well as block copolyether esters derived from hydroxyl-terminated polyethers; and also polyesters modified with polycarbonates or MBS.
19. Polycarbonates and polyester carbonates.
20. Polyketones.
21. Polysulfones, polyether sulfones and polyether ketones.
22. Natural polymers such as cellulose, rubber, gelatin and chemically modified homologous derivatives thereof, for example cellulose acetates, cellulose propionates and cellulose butyrates, or the cellulose ethers such as methyl cellulose; as well as rosins and their derivatives.
23. Blends of the aforementioned polymers (polyblends), for example PP/EPDM, Polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and copolymers, PA/HDPE, PA/PP, PA/PPO, PBT/PC/ABS or PBT/PET/PC. In the case of blends, it is sufficient if only one component is modified with the reactive group.

In a preferred embodiment the copolymer of step b) is a grafted copolymer having the functional groups X in the graft structure.

For example the copolymer of step b) is selected from the group consisting of poylpropylene(PP)-graft(g)-maleic acid anhydride(MAA), ethylene-propylene-dien monomer (EPDM)-g-MAA, polyethylene(PE)-g-MAA, high density polyethylene(HDPE)-g-MAA, PP-g-acrylic acid(AA), linear low density polyethylene(LLDPE)-g-MAA, PE-co-PEA-g-MAA, PE-co-polyvinylacetate(PVA)-g-MAA, PE-co-PP-g-MAA, polystyrene(PS)-co-hydrogenated polyisoprene-g-MAA, polystyrene-co-polybutadiene(PS)-g-MAA, PS-co-PE/polybutylene-co-PS-g-MAA, polyethylene(PE)-g-acrylic acid, polypropylene(PP)-g-acrylic acid, polystyrene (PS)-co-maleic acid anhydride(MAA) (alternating copolymer) and aminoethylacrylate-co-polystyrene(PS).

In particular the copolymer of step b) is PP-g-MAA or EPDM-g-MAA.

The above mentioned polymers are known and to a great extent items of commerce. Examples of commercially available polymers are the following:
Exxelor® PO 1020 (PP-g-MAA, Exxon)
Exxelor® VA 1803 (EPDM-g-MAA, Exxon)
Septon® KL-01 M2 (Diblockcopolymer PS-co-hydrogenated polyisoprene-g-MMA, Kuraray)
Kraton® FG 1901 X (Triblockcopolymer PS-co-PE/Polybutylene PS-g-MAA)
Polybond® 3009 (HDPE-9-MAA, Crompton Corp.)
Polybond® 1001 (PP-g-AA, Crompton Corp.)
Royaltuf® 465 A (EPDM-g-MAA, Uniroyal)
Fusabond® MF416D (Diblockcopolymer PE-co-PP-g-MAA, Du Pont)
Fusabond® MB-226D (LLDPE-g-MAA, Du Pont)
Lotader® (PE-co-PEA-g-MAA(GMA), Atofina)
Nucrel® (PE-g-MAA, Dupont)
Orevac® (PE-co-PVA-g-MAA, Atofina)
Admer® (PE-co-PVA-g-MMA Mitsul Petroch.)

Very suitable commercial copolymers are for example Exxelor® PO 1020 (PP-g-MAA, Exxon) and Exxelor® VA 1803 (EPDM-g-MAA, Exxon).

The polymer or copolymer of step a) is added to the copolymer of step b) for example in an amount of from 0.1% to 100% by weight based on the weight of of the copolymer of step b).

Step b) of the process may be performed in any reactor suitable for mixing a polymer melt. For instance the apparatus suitable for mixing a polymer melt is a mixer, kneader or extruder.

Preferably the reactor is an extruder or kneading apparatus as for example described in "Handbuch der Kunststoffextrusion" Vol. I, editor F. Hensen, W. Knappe and H. Potente, 1989, pages 3-7. If an extruder is used the process may be described as reactive extrusion process. There may be used single screw extruders, contrarotating and corotating twin-screw extruders, planetary-gear extruders, ring extruders or cokneaders. It is also possible to use processing machines provided with at least one gas removal compartment to which a vacuum can be applied.

Examples of reactiv extrusion equipment and processes are given by G. H. Hu et al., in "Reactive Modifiers for Polymers", first edition, Blackie Academic & Professional an Imprint of Chapman & Hall, London 1997, chapter 1, pages 1-97.

For instance, if an extruder is used, a reduced pressure of less than 200 mbar is applied during extrusion. Volatile by products are removed thereby.

Alternatively the reaction can be performed in a suitable solvent, which is able to solve at least partly the polymer of step b). Suitable solvents are e.g. toluene, decaline for PP-g-MAA, chloro- or dichlorobenzene for SBS-g-MAA.

The processing temperature and reaction time depend on polymer type and epoxy-terminated functionalized NO-oligomers/polymers. The temperature is generally above the softening point of the polymers/oligomers to create a well processible and homogeneous melt. The reaction time is selected to achieve maximum grafting yield. Typical reaction times are from a few minutes to an hour. Preferably the reaction time is from 1 min to 1 h, most preferably from 2 min to 20 min.

Typically the processing temperature of step b) is between 150° C. and 250° C.

A further aspect of the invention is a composition comprising a polymer or copolymer prepared by polymerizing at least one ethylenically unsaturated monomer in the presence of an initiator/regulator of formula (I) as defined above and a random, block or graft copolymer, having attached a functional group X selected from the group consisting of

—COOH, —NH$_2$, —NHR', —C(O)—NHR',

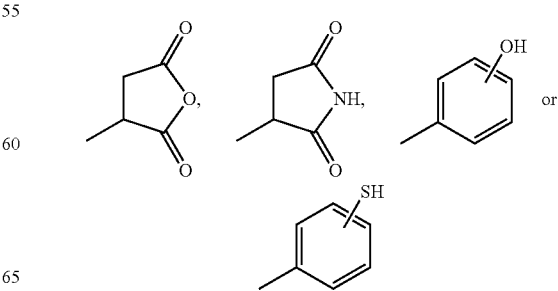

or having a group X

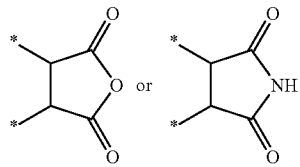

as repetitive unit in the backbone.

Also an aspect of the invention is a comb copolymer obtainable by the method described above.

The invention also comprises a polymer of formula (III)

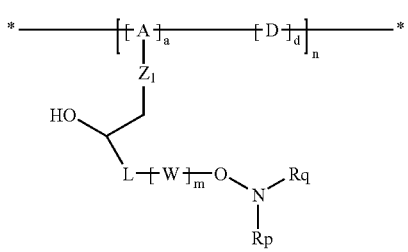

wherein

A and D are repeating units derived from at least one ethylenically unsaturated monomer;

a is a number from 1 to 100;

d is a number from 1 to 100;

n is a number from 1 to 1000;

$Z_1$ is the reaction product of the group X, defined in claim 1 with the epoxide group of the polymer defined in step a) of claim 1;

W is the repeating unit of the polymer defined in step a) of claim 1;

m is a number from 5 to 1000;

L is a linking group selected from the group consisting of $C_1$-$C_{18}$alkylene, phenylene, $C_1$-$C_{18}$alkylene-oxy substituted with a phenyl group, phenylene-$C_1$-$C_{18}$alkylene, $C_1$-$C_{18}$alkylene-phenylene, $C_1$-$C_{18}$alkylene-phenylene-oxy and $C_5$-$C_{12}$cycloalkylene; and $R_p$ and $R_q$ are independently tertiary bound $C_4$-$C_{28}$alkyl groups or $C_3$-$C_{17}$ secondary bound alkyl groups which are unsubstituted or substitituted by one or more electron withdrawing groups or by phenyl; or $R_p$ and $R_q$ together form a 5, 6 or 7 membered heterocyclic ring which is substituted at least by 4 $C_1$-$C_4$alkyl groups and which may be interrupted by a further nitrogen or oxygen atom.

In particular the polymer is of formula (IIIa)

(IIIa)

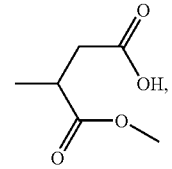

wherein $R_1$ to $R_8$ are as defined above.

For example $Z_1$ is a group —C(O)—O— or which is grafted to the polymer backbone via the carbon atom.

Definitions and preferences for the individual substituents have already been given for the process of polymerization. They apply also for the other aspects of the invention.

The comb copolymers prepared by the present invention are useful for following applications: adhesives, dispersants, emulsifiers, surfactants, defoamers, adhesion promoters, corrosion inhibitors, viscosity improvers, lubricants, rheology modifiers, thickeners, crosslinkers, paper treatment, water treatment, electronic materials, paints, coatings, superabsorbants, cosmetics, hair products, biocide materials or modifiers for asphalt, leather, textiles, barrier materials, ceramics and wood.

Consequently a further aspect of the invention is the use of a comb copolymer prepared by the method described above as dispersing agent, compatibilizer, coupling agent, barrier material, adhesive and surface or impact modifier.

The following examples illustrate the invention.

The following initiator/regulator compound is used for controlled free radical polymerization (step a): 3,3,8,8,10,10-hexamethyl-9-[1-(4-oxiranylmethoxy-phenyl)-ethoxy]-1,5-dioxa-9-aza-spiro[5.5]undecane (compound 103, Table A). The compound is prepared as described in WO 02/48109, example A2.

A1) Synthesis of an Epoxy-Terminated Polystyrene According to step a)

Styrene is distilled under reduced pressure prior to use. In a dry, argon-purged glass vessel, 1 mol % 3,3,8,8,10,10-hexamethyl-9-[1-(4-oxiranylmethoxy-phenyl)-ethoxy]-1,5-dioxa-9-aza-spiro[5.5]undecane is dissolved in 814.1 g styrene. The solution is degassed in three consecutive freeze-thaw-cycles and then purged with argon. The stirred solution is then immersed in an oil bath and polymerized at 125° C. for 6 hours. After polymerization, residual monomer is removed under vacuum at 70° C. and the polymer is dried at 70° C. in a vacuum oven until constant weight is achieved. The number average molecular weight is determined by gel-permeation-chromatography (GPC) with a Hewlett Packart HP 1090 LC (column PSS 1, lengths 60 cm, elution with tetrahydrofurane (THF), rate 1 ml/min, concentration 10 mg polymer in 1 ml THF, calibration with styrene). The polydispersity is calculated from $M_n$ (g/mol) and $M_w$ (g/mol) as $PD=M_w/M_n$.

Polymer 1=Epoxy-terminated-polystyrene ($M_n$=5900 g/mol)
  Epoxy content>95% (determination via $^1$H-NMR)

A2) Synthesis of an Epoxy-Terminated SAN According to Step a)

Styrene is distilled under reduced pressure prior to use and acrylonitrile is used undistilled. In a dry, 2 l Büchi-autoklave, 1 mol % 3,3,8,8,10,10-hexamethyl-9-[1-(4-oxiranyl-methoxy-phenyl)-ethoxy]-1,5-dioxa-9-aza-spiro[5.5]undecane is dissolved in 1125 g styrene and 375 g acrylonitrile. The solution is degassed and then purged with argon. The stirred solution is then immersed in an oil bath and polymerized at 110° C. for 6 hours. After polymerization the polymer is precipitated in methanol and dried at 40° C. in a vacuum oven until constant weight is achieved. The number average molecular weight is determined by gel-permeation-chromatography (GPC) with a Hewlett Packart HP 1090 LC (column PSS 1, lengths 60 cm, elution with tetrahydrofurane (THF), rate 1 ml/min, concentration 10 mg polymer in 1 ml THF, calibration with styrene). The polydispersity is calculated from $M_n$ (g/mol) and $M_w$ (g/mol) as $PD=M_w/M_n$.

Polymer 2=Epoxy-terminated-SAN (Mn=3550 g/mol)
  Epoxy content>95% (determination via $^1$H-NMR)

A3) Synthesis of an Epoxy-Terminated PS-co-PMMA According to Step a)

Styrene and MMA are distilled under reduced pressure prior to use. In a dry, 2 l Büchi-autoklave, 1 mol % 3,3,8,8,10,10-hexamethyl-9-[1-(4-oxiranylmethoxy-phenyl)-ethoxy]-1,5-dioxa-9-aza-spiro[5.5]undecane is dissolved in 750 g (375 g for polymer 4) styrene and 750 g (1125 g for polymer 4) MMA. The solution is degassed and then purged with argon. The stirred solution is then immersed in an oil bath and polymerized at 110° C. for 6 hours. After polymerization the polymer is precipitated in methanol and dried at 40° C. in a vacuum oven until constant weight is achieved. The number average molecular weight is determined by gel-permeation-chromatography (GPC) with a Hewlett Packart HP 1090 LC (column PSS 1, lengths 60 cm, elution with tetrahydrofurane (THF), rate 1 ml/min, concentration 10 mg polymer in 1 ml THF, calibration with styrene). The polydispersity is calculated from $M_n$ (g/mol) and $M_w$ (g/mol) as $PD=M_w/M_n$.

Polymer  3=Epoxy-terminated-PS-co-PMMA  (1:1) ($M_n$=3650 g/mol)
  Epoxy content>95% (determination via $^1$H-NMR)
Polymer  4=Epoxy-terminated-PS-co-PMMA  (1:3) ($M_n$=4610 g/mol)
  Epoxy content>95% (determination via $^1$H-NMR)

B1) B2) Grafting of polymer 1 of example A1 onto PP-g-MAA 350 g PP-G-MAA are extruded in the presence of 35 g (10%) resp. 70 g (20%) polymer 1 (see table 1) in a twin screw extruder (Haake TW 100) at 150° C. and 60 rpm. The resulting polymer is strand granulated and the MFR is determined in accordance with ISO 1133. A small amount of unreacted polymer 1 is removed by dissolving the samples in 1,2-dichlorobenzene at 130° C. The comb polymer is precipitated in methanol and dried in a vacuum oven at 90° C.

The number average molecular weight is determined by high-temperature-gel-permeation-chromatography (HT-GPC) with a Polymer Laboratories PL-GPC 220 (columns waters HT2, HT3, HT4, HT5, HT6, elution with 1,2,4-trichlorobenzene at 140° C., injection volume 1 μl, RI detection, calibration with 10 polystyrene-standards from Polymer Laboratories (molecular weight array 580-7,5*10$^6$), software: PSS WINGPC V. 6.02)). The polydispersity is calculated from $M_n$ (g/mol) and $M_w$ (g/mol) as $PD=M_w/M_n$.

The result is shown in Table 1.

TABLE 1

Grafting of polymer 1 onto PP-g-MAA

| Example | Polymer | Epoxy-funct. NO-term-PS | MFR | Mn [g/mol] | Increase of Mn [%] | PD |
|---|---|---|---|---|---|---|
| Reference | PP-g-MAA | 0 | 96 | 46350 | 0 | 2.5 |
| B1 | PP-g-MAA | 10% polymer 1 | 90 | 62500 | 34.8 | 2.0 |
| B2 | PP-g-MAA | 20% polymer 1 | 95 | 72700 | 56.9 | 1.9 |

Reference: without addition of polymer 1
PP-g-MAA: Exxelor PO 1020 (commercial product, Exxon)
MFR: 190° C.; 1.2 kg B3) B4) Grafting of Polymer 1 onto EPDM-g-MAA 350 g EPDM-g-MAA are extruded in the presence of 35 g (10%) polymer 1 (see Table 2) in a twin screw extruder (Haake TW 100) at 190° C. (B3) resp. 210° C. (B4) and 50 rpm. The resulting polymer is strand granulated and the MFR is determined in accordance with ISO 1133. A small amount of unreacted polymer 1 is removed by dissolving the samples in 1,2-dichlorobenzene at 130° C. The comb polymer is precipitated in methanol and dried in a vacuum oven at 90° C.

The number average molecular weight is determined by high-temperature-gel-permeation-chromatography (HT-GPC) with a Polymer Laboratories PL-GPC 220 (columns waters HT2, HT3, HT4, HT5, HT6, elution with 1,2,4-Trichlorobenzene at 140° C., injection volume 1 μl, RI detection, calibration with 10 polystyrene-standards from Polymer Laboratories (molecular weight array 580-7,5*10$^6$), software: PSS WINGPC V. 6.02)). The polydispersity is calculated from $M_n$ (g/mol) and $M_w$ (g/mol) as $PD=M_w/M_n$.

TABLE 2

Grafting of compound 1 onto EPDM-g-MAA

| Example | Polymer | Epoxy-funct. NO-term-PS | MFR | Mn [g/mol] | Increase of Mn [%] | PD |
|---|---|---|---|---|---|---|
| Reference | EPDM-g-MAA | 0 | 40 | 88300 | 0 | 3.6 |
| B3 | EPDM-g-MAA | 10% polymer 1 | 63 | 105000 | 18.1 | 3.0 |
| B4 | EPDM-g-MAA | 10% polymer 1 | 51 | 109000 | 23.4 | 3.1 |

Reference: without addition of polymer 1
EPDM-g-MM: Exxelor VA 1803 (commercial product, Exxon)
MFR: 200° C.; 21.6 kg B5) Grafting of Polymer 2 of Example A2 onto PP-g-MAA 350 g PP-g-MAA are extruded in the presence of 70 g (20%) polymer 2 (see table 3) in a twin screw extruder (Haake TW 100) at 150° C. and 40 rpm. The resulting polymer is strand granulated and the MFR is determined in accordance with ISO 1133.

The number average molecular weight is determined by high-temperature-gel-permeation-chromatography (HT- GPC) with a Polymer Laboratories PL-GPC 220 (columns waters HT2, HT3, HT4, HT5, HT6, elution with 1,2,4-trichlorobenzene at 140° C., injection volume 1 μl, RI detection, calibration with 10 polystyrene-standards from Polymer Laboratories (molecular weight array 580-7,5*106), software: PSS WINGPC V. 6.02)). The polydispersity is calculated from $M_n$ (g/mol) and $M_w$ (g/mol) as PD $M_w/M_n$.

The result is shown in Table 3.

TABLE 3

Grafting of polymer 2 onto PP-g-MAA

| Example | Polymer | Epoxy-funct. NO-term-PS | MFR | Mn [g/mol] | Increase of Mn [%] | PD |
|---|---|---|---|---|---|---|
| Reference | PP-g-MAA | 0 | 102.9 | 44100 | 0 | 2.8 |
| B5 | PP-g-MAA | 10% polymer 2 | 4.33 | 53100 | 20.4 | 2.3 |

Reference: without addition of polymer 2
PP-g-MAA: Exxelor PO 1020 (commercial product, Exxon)
MFR: 190° C.; 1.2 kg B6) B7) Grafting of Polymer 3 and Polymer 4 of Example A3 onto PP-g-MAA 350 g PP-g-MAA are extruded in the presence of 35 g (10%) polymer 3 or polymer 4 (see table 4) in a twin screw extruder (Haake TW 100) at 150° C. and 40 rpm. The resulting polymer is strand granulated and the MFR is determined in accordance with ISO 1133.

The number average molecular weight is determined by high-temperature-gel-permeation-chromatography (HT-GPC) with a Polymer Laboratories PL-GPC 220 (columns waters HT2, HT3, HT4, HT5, HT6, elution with 1,2,4-trichlorobenzene at 140° C., injection volume 1 μl, RI detection, calibration with 10 polystyrene-standards from Polymer Laboratories (molecular weight array 580-7,5*$10^6$), software: PSS WINGPC V. 6.02)). The polydispersity is calculated from $M_n$ (g/mol) and $M_w$ (g/mol) as PD=$M_w/M_n$.

The result is shown in Table 4.

TABLE 4

Grafting of polymer 3 or polymer 4 onto PP-g-MAA

| Example | Polymer | Epoxy-funct. NO-term-PS | MFR | Mn [g/mol] | Increase of Mn [%] | PD |
|---|---|---|---|---|---|---|
| Reference | PP-g-MAA | 0 | 102.9 | 44100 | 0 | 2.8 |
| B6 | PP-g-MAA | 10% polymer 3 | 56.8 | 49000 | 11.1 | 3.0 |
| B7 | PP-g-MAA | 10% polymer 4 | 67.2 | 50000 | 13.4 | 3.0 |

Reference: without addition of polymer 3 or polymer 4
PP-g-MAA: Exxelor PO 1020 (commercial product, Exxon)
MFR: 190° C.; 1.2 kg

The invention claimed is:

1. A method for the preparation of a comb copolymer comprising the steps
   a) polymerizing an ethylenically unsaturated monomer to an oligomer, cooligomer, polymer or copolymer in the presence of an initiator/regulator of formula (I)

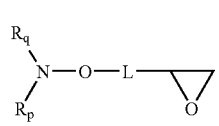

wherein L is a linking group selected from the group consisting of $C_1$-$C_{18}$alkylene, phenylene, $C_1$-$C_{18}$alkylene-oxy substituted with a phenyl group, phenylene-$C_1$-$C_{18}$alkylene, $C_1$-$C_{18}$alkylene-phenylene, $C_1$-$C_{18}$alkylene-phenylene-oxy and $C_5$-$C_{12}$cycloalkylene;

$R_p$ and $R_q$ are independently tertiary bound $C_4$-$C_{28}$alkyl groups or $C_3$-$C_{17}$ secondary bound alkyl groups which are unsubstituted or substitituted by one or more electron withdrawing groups or by phenyl; or $R_p$ and $R_q$ together form a 5, 6 or 7 membered heterocyclic ring which is substituted at least by 4 $C_1$-$C_4$alkyl groups and which may be interrupted by a further nitrogen or oxygen atom;

and in a second step
   b) reacting the oligomer, cooligomer, polymer or copolymer prepared under a) together with a grafted copolymer, which grafted copolymer functional groups X in the graft structure, where X is selected from the group consisting of —COOH, —NH$_2$, —NHR', —C(O)—NHR',

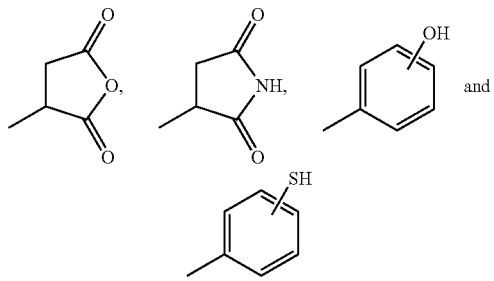

and where R' is $C_1$-$C_{18}$alkyl,
in the melt in an apparatus suitable for mixing a polymer melt.

2. A method according to claim 1 wherein the ethylenically unsaturated monomer of step a) is selected from the group consisiting of styrene, substituted styrene, conjugated dienes, vinyl acetate, vinylpyridine, vinylpyrrolidone, vinylimidazole, maleic anhydride, (alkyl)acrylic acidanhydrides, (alkyl) acrylic acid salts, (alkyl)acrylic esters, (meth)acrylonitriles, (alkyl)acrylamides, vinyl halides and vinylidene halides.

3. A method according to claim 2 wherein in step a) the ethylenically unsaturated monomer is styrene, substituted styrene, methylacrylate, ethylacrylate, butylacrylate, isobutylacrylate, tert. butylacrylate, hydroxyethylacrylate, hydroxypropylacrylate, dimethylaminoethylacrylate, methyl(meth) acrylate, ethyl(meth)acrylate, butyl(meth)acrylate, hydroxyethyl(meth)acrylate, hydroxypropyl(meth)acrylate, dimethylaminoethyl(meth)acrylate, acrylonitrile, methacrylonitrile, acrylamide, methacrylamide or dimethylaminopropyl-methacrylamide.

4. A method according to claim 1 wherein the initiator/regulator is of formula (IIa)

(IIa)

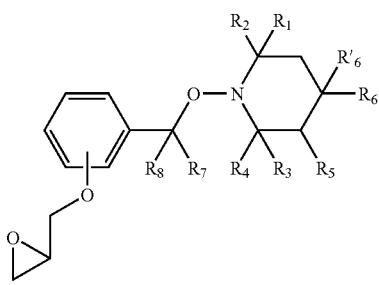

wherein

R$_1$, R$_2$, R$_3$ and R$_4$ are independently of each other C$_1$-C$_4$alkyl;

R$_5$ is hydrogen or C$_1$-C$_4$alkyl;

R'$_6$ is hydrogen and R$_6$ is H, OR$_{10}$, NR$_{10}$R$_{11}$, —O—C(O)—R$_{10}$ or NR$_{11}$—C(O)—R$_{10}$;

R$_{10}$ and R$_{11}$ independently are hydrogen, C$_1$-C$_{18}$alkyl, C$_2$-C$_{18}$alkenyl, C$_2$-C$_{18}$alkinyl or C$_2$-C$_{18}$alkyl which is substituted by at least one hydroxy group or, if R$_6$ is NR$_{10}$R$_{11}$, taken together, form a C$_2$-C$_{12}$alkylene bridge or a C$_2$-C$_{12}$-alkylene bridge interrupted by at least one O atom; or R$_6$ and R'$_6$ together are both hydrogen, a group =O or =N—O—R$_{20}$ wherein R$_{20}$ is H, straight or branched C$_1$-C$_{18}$alkyl, C$_3$-C$_{18}$alkenyl or C$_3$-C$_{18}$alkinyl, which may be unsubstituted or substituted by one or more OH, C$_1$-C$_8$alkoxy, carboxy or C$_1$-C$_8$alkoxycarbonyl;

C$_5$-C$_{12}$cycloalkyl or C$_5$-C$_{12}$cycloalkenyl; phenyl, C$_7$-C$_9$phenylalkyl or naphthyl which may be unsubstituted or substituted by one or more C$_1$-C$_8$alkyl, halogen, OH, C$_1$-C$_8$alkoxy, carboxy or C$_1$-C$_8$alkoxycarbonyl; —C(O)—C$_1$-C$_{36}$alkyl, or an acyl moiety of a α,β-unsaturated carboxylic acid having 3 to 5 carbon atoms or of an aromatic carboxylic acid having 7 to 15 carbon atoms;

—SO$_3$$^-$Q$^+$, —PO(O$^-$Q$^+$)$_2$, —P(O)(OR$_2$)$_2$, —SO$_2$—R$_2$, —CO—NH—R$_2$, —CONH$_2$, COOR$_2$, or Si(Me)$_3$, wherein Q$^+$ is H$^+$, ammonium or an alkali metal cation; or R$_6$ and R$_6$' are independently —O—C$_1$-C$_{12}$alkyl, —O—C$_3$-C$_{12}$alkenyl, —O—C$_3$-C$_{12}$alkinyl, —O—C$_5$-C$_8$cycloalkyl, —O-phenyl, —O-naphthyl or —O—C$_7$-C$_9$phenylalkyl; or R$_6$ and R'$_6$ together form one of the bivalent groups —O—C(R$_{21}$)(R$_{22}$)—CH(R$_{23}$)—O—, —O—CH(R$_{21}$)—CH$_{22}$—C(R$_{22}$)(R$_{23}$)—O—, —O—CH(R$_{22}$)—CH$_2$—C(R$_{21}$)(R$_{23}$)—O—, —O—CH$_2$—C(R$_{21}$)(R$_{22}$)—CH(R$_{23}$)—O—, —O—o-phenylene-O—, —O-1,2-cyclohexyliden-O—, —O—CH$_2$—CH=CH—CH$_2$—O— or

wherein

R$_{21}$ is hydrogen, C$_1$-C$_{12}$alkyl, COOH, COO—(C$_1$-C$_{12}$)alkyl or CH$_2$OR$_{24}$;

R$_{22}$ and R$_{23}$ are independently hydrogen, methyl ethyl, COOH or COO—(C$_1$-C$_{12}$)alkyl;

R$_{24}$ is hydrogen, C$_1$-C$_{12}$alkyl, benzyl, or a monovalent acyl residue derived from an aliphatic, cycloaliphatic or aromatic monocarboxylic acid having up to 18 carbon atoms; and R$_7$ and R$_8$ are independently hydrogen or C$_1$-C$_{18}$alkyl.

5. A method according to claim 4 wherein R$_1$, R$_2$, R$_3$, R$_4$ are methyl, or R$_1$ and R$_3$ are ethyl and R$_2$ and R$_4$ are methyl, or R$_1$ and R$_2$ are ethyl and R$_3$ and R$_4$ are methyl.

6. A method according to claim 4 wherein R$_5$ is hydrogen or methyl.

7. A method according to claim 4 wherein

R'$_6$ is hydrogen and R$_6$ is H, OR$_{10}$, NR$_{10}$R$_{11}$, —O—C(O)—R$_{10}$ or NR$_{11}$—C(O)—R$_{10}$;

R$_{10}$ and R$_{11}$ independently are hydrogen, C$_1$-C$_{18}$alkyl, C$_2$-C$_{18}$alkenyl, C$_2$-C$_{18}$alkinyl or C$_2$-C$_{18}$alkyl which is substituted by at least one hydroxy group or, if R$_6$ is NR$_{10}$R$_{11}$, taken together, form a C$_2$-C$_{12}$alkylene bridge or a C$_2$-C$_{12}$-alkylene bridge interrupted by at least one O atom;

R$_6$ and R'$_6$ together are both hydrogen, a group =O or =N—O—R$_{20}$ wherein R$_{20}$ is H or straight or branched C$_1$-C$_{18}$alkyl.

8. A method according to claim 4 wherein

R$_6$ and R'$_6$ together form one of the bivalent groups —O—C(R$_{21}$)(R$_{22}$)—CH(R$_{23}$)—O—, —O—CH(R$_{21}$)—CH$_{22}$—C(R$_{22}$)(R$_{23}$)—O—, —O—CH(R$_{22}$)—CH$_2$—C(R$_{21}$)(R$_{23}$)—O— or —O—CH$_2$—C(R$_{21}$)(R$_{22}$)—CH(R$_{23}$)—O—.

9. A method according to claim 1 wherein the initiator/regulator is of formula (IIb)

(IIb)

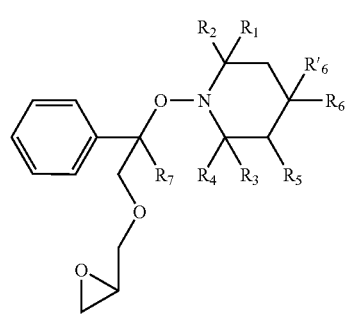

wherein

R$_1$, R$_2$, R$_3$ and R$_4$ are independently of each other C$_1$-C$_4$alkyl;

R$_5$ is hydrogen or C$_1$-C$_4$alkyl;

R'$_6$ is hydrogen and R$_6$ is H, OR$_{10}$, NR$_{10}$R$_{11}$, —O—C(O)—R$_{10}$ or NR$_{11}$—C(O)—R$_{10}$;

R$_{10}$ and R$_{11}$ independently are hydrogen, C$_1$-C$_{18}$alkyl, C$_2$-C$_{18}$alkenyl, C$_2$-C$_{18}$alkinyl or C$_2$-C$_{18}$alkyl which is substituted by at least one hydroxy group or, if R$_6$ is NR$_{10}$R$_{11}$, taken together, form a C$_2$-C$_{12}$alkylene bridge or a C$_2$-C$_{12}$-alkylene bridge interrupted by at least one O atom; or R$_6$ and R'$_6$ together are both hydrogen, a group =O or =N—O—R$_{20}$ wherein R$_{20}$ is H, straight or branched C$_1$-C$_{18}$alkyl, C$_3$-C$_{18}$alkenyl or C$_3$-C$_{18}$alkinyl, which may be unsubstituted or substituted by one or more OH, $C_1$-$C_8$alkoxy, carboxy or $C_1$-$C_8$alkoxycarbonyl; $C_5$-$C_{12}$cycloalkyl or $C_5$-$C_{12}$cycloalkenyl; phenyl, $C_7$-$C_9$phenylalkyl or naphthyl which may be unsubstituted or substituted by one or more $C_1$-$C_8$alkyl, halogen, OH, $C_1$-$C_8$alkoxy, carboxy or $C_1$-$C_8$alkoxycarbonyl;

—C(O)—$C_1$-$C_{36}$alkyl, or an acyl moiety of a α,β-unsaturated carboxylic acid having 3 to 5 carbon atoms or of an aromatic carboxylic acid having 7 to 15 carbon atoms;

—$SO_3^-Q^+$, —$PO(O^-Q^+)_2$, —$P(O)(OR_2)_2$, —$SO_2$—$R_2$, —CO—NH—$R_2$, $CONH_2$, or $Si(Me)_3$, wherein $Q^+$ is $H^+$, ammonium or an alkali metal cation; or $R_6$ and $R_6'$ are independently —O—$C_1$-$C_{12}$alkyl, —O—$C_3$-$C_{12}$alkenyl, —O—$C_3$-$C_{12}$alkinyl, —O—$C_5$-$C_8$cycloalkyl, —O-phenyl, —O-naphthyl or —O—$C_7$-$C_9$phenylalkyl; or $R_6$ and $R'_6$ together form one of the bivalent groups —O—C($R_{21}$)($R_{22}$)—CH($R_{23}$)—O—, —O—CH($R_{21}$)—$CH_{22}$—C($R_{22}$)($R_{23}$)—O—, —O—CH($R_{22}$)—$CH_2$—C($R_{21}$)($R_{23}$)—O—, —O—$CH_2$—C($R_{21}$)($R_{22}$)—CH($R_{23}$)—O—, —O—o-phenylene-O—, —O-1,2-cyclohexyliden-O—, —O—$CH_2$—CH═CH—$CH_2$—O— or

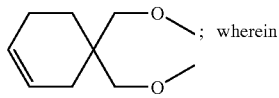; wherein wherein $R_{21}$ is hydrogen, $C_1$-$C_{12}$alkyl, COOH, COO—($C_1$-$C_{12}$)alkyl or $CH_2OR_{24}$;

$R_{22}$ and $R_{23}$ are independently hydrogen, methyl ethyl, COOH or COO—($C_1$-$C_{12}$)alkyl;

$R_{24}$ is hydrogen, $C_1$-$C_{12}$alkyl, benzyl, or a monovalent acyl residue derived from an aliphatic, cycloaliphatic or aromatic monocarboxylic acid having up to 18 carbon atoms; and $R_7$ and $R_8$ are independently hydrogen or $C_1$-$C_{18}$alkyl.

10. A method according to claim 1 wherein the copolymer of step b) is selected from the group consisting of poylpropylene(PP)-graft(g)-maleic anhydride(MAA), ethylene-propylene-dien monomer(EPDM)-g-MAA, polyethylene(PE)-g-MAA, high density polyethylene(HDPE)-g-MAA, PP-g-acrylic acid(AA), linear low density polyethylene(LLDPE)-g-MAA, PE-co-PEA-g-MAA, PE-co-polyvinylacetate (PVA)-g-MAA, PE-co-PP-g-MAA, polystyrene(PS)-co-hydrogenated polyisoprene-g-MAA, polystyrene-co-polybutadiene(PS)-g-MAA, PS-co-PE/polybutylene-co-PS-g-MAA, polyethylene(PE)-g-acrylic acid and polypropylene (PP)-g-acrylic acid.

11. A method according to claim 10 wherein the copolymer of step b) is PP-g-MAA or EPDM-g-MAA.

12. A method according to claim 1 wherein the polymer or copolymer of step a) is added to the copolymer of step b) in an amount of from 0.1% to 100% by weight based on the weight of the copolymer of step b).

13. A method according to claim 1 wherein the oligomer, cooligomer, polymer or copolymer of step a) has a polydispersity between 1.0 and 2.5.

14. A method according to claim 1 wherein the apparatus suitable for mixing a polymer melt is a mixer, kneader or extruder.

15. A method according to claim 1 wherein the processing temperature of step b) is between 150° C. and 250° C.

* * * * *